United States Patent [19]

Maslanka

[11] 4,037,017
[45] July 19, 1977

[54] ELECTROCONDUCTIVE PAPER

[75] Inventor: William Walter Maslanka, London-Britain Township, Chester County, Pa.

[73] Assignee: Hercules Incorporated, Wilmington, Del.

[21] Appl. No.: 638,786

[22] Filed: Dec. 8, 1975

[51] Int. Cl.² .................... B32B 27/38; B32B 33/00
[52] U.S. Cl. ............................... 428/413; 428/913; 428/537; 428/414; 162/138; 162/168 N; 260/79.3 MU; 526/259; 526/265; 96/1.5; 96/1.6; 96/1.7; 427/391; 427/121
[58] Field of Search ............... 428/413, 543, 414, 913; 162/138, 168, 169; 260/89.7 N, 79.3 MU; 526/259, 265

[56] References Cited

U.S. PATENT DOCUMENTS

| 3,515,707 | 6/1970 | Reimschuessel et al. ....... 162/138 X |
| 3,544,318 | 12/1970 | Boothe et al. .................... 162/138 X |
| 3,640,766 | 2/1972 | Jursich et al. ................... 162/138 X |
| 3,787,235 | 1/1974 | Honjo et al. ..................... 162/138 X |
| 3,833,531 | 9/1974 | Keim ............................ 162/168 NA |
| 3,887,496 | 6/1975 | Cormer et al. .................. 162/138 X |

Primary Examiner—P. C. Ives
Attorney, Agent, or Firm—Charles L. Board

[57] ABSTRACT

Disclosed is electroconductive paper adapted particularly for use in the manufacture of paper used in the electrophotographic reproduction of images.

3 Claims, No Drawings

ELECTROCONDUCTIVE PAPER

This invention relates to novel electroconductive paper sheeting comprised of a web of cellulosic fibers having disposed on at least one surface thereof an electroconductive layer or coating, said layer consisting essentially of an electroconductive resin.

The use of electroconductive paper in the manufacture of electrophotographic recording sheets is known in the art. By way of example only, see U.S. Pat. No. 3,653,894, reference to which is hereby made.

In accordance with this invention there is provided a new electroconductive paper comprised of a web of cellulosic fibers, kraft paper sheet for example, having disposed on at least one surface thereof an electroconductive layer or coating, said layer consisting essentially of an electroconductive resin to be detailed more fully hereinafter. The electroconductive paper has particular utility as a base for the application of a photoconductive surface, i.e., zinc oxide in an insulating binder, to provide sheeting for use in electrophotographic printing.

THE ELECTROCONDUCTIVE RESIN

The electroconductive resin used in this invention is a cationic water-soluble resin derived by reaction of (1) a tertiary amine, such as trimethylamine and (2) a water-soluble or water-dispersible poly(alkyldiallylamine)-—epichlorohydrin base resin containing epoxide moieties. Thus, the electroconductive resin consists essentially of the reaction product of a tertiary amine and the base resin.

Tertiary amines employed in preparing the electroconductive resin have the formula $R_1R_2R_3N$ where $R_1$, $R_2$, and $R_3$ are the same or different alkyls having from 1 through 9 carbon atoms, preferably 1 through 4 carbon atoms. Examples of tertiary amines of the above formula are trimethylamine; triethylamine; tripropylamine; tributylamine; triisobutylamine; N-ethyl-N-methylpropylamine; N,N-dimethylethylamine; N,N-diethylpropylamine; N,N-dimethyl-isopropylamine; and N-ethyl-N-isopropylbutylamine.

The poly(alkyldiallylamine)—epichlorohydrin base resin used to prepare the electroconductive resins used in this invention comprises the resinous reaction product of (A) a linear polymer having units of the formula

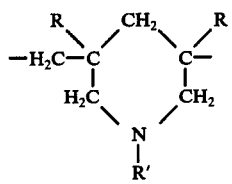

(I)

where R is hydrogen or lower alkyl and R' is alkyl or a substituted alkyl and (B) epichlorohydrin. The base resins will have an RSV of 0.2 to 0.4 (1M NaCl, 1%, 25° C.).

In the above formula, each R can be the same or different and, as stated, can be hydrogen or lower alkyl. The alkyls contain from 1 through 6 carbon atoms and are preferably methyl, ethyl, isopropyl or n-butyl. R' of the formula represents alkyl or substituted alkyl. The R' alkyls will contain from 1 through 6 carbon atoms such as methyl, ethyl, propyl, isopropyl, butyl, tert-butyl, and hexyl. Preferably the R' alkyls will contain from 1 through 4 carbon atoms. R' can also be a substituted alkyl. Suitable substituents include, in general, any group which will not interfere with polymerization through a vinyl double bond. Typically, the substituents can be carboxylate, cyano, ether, amino (primary, secondary or tertiary), amide, hydrazide and hydroxyl.

The base resin consists essentially of the reaction product of a linear polymer wherein from 5 to 100% of the recurring units have the formula (1) with from about 0.5 mole to about 1.5 moles of epichlorohydrin per mole of tertiary amine present in said polymer at a temperature of about 30° to about 80° C., preferably from about 45° to 55° C., and at a pH from about 7 to about 9.5 whereby there is produced the base resin containing epoxide groups.

The poly(N-alkyldiallylamine)-epichlorohydrin base resins having epoxide moieties are well known in the art and are disclosed and described in U.S. Pat. Nos. 3,700,623; 3,772,076; 3,833,531; and 3,840,504. These patents are incorporated herein by reference.

In preparing the electroconductive resins used in this invention, the reaction of the base resin and the tertiary amine is carried out in a liquid medium that is a solvent for both the base resin and the tertiary amine and that is inert to the base resin; the tertiary amine and the product of the reaction. Preferably, the liquid medium is an aqueous medium. The solids concentration of the base resin is an aqueous medium. The solids concentration of the base resin in the reaction medium, prior to reaction, will be, by weight, from about 1 to about 25% and preferably from about 5 to about 10%. Too high a solids concentration will sometimes produce gelatin which is undesirable. Reaction is carried out under pressure or at atmospheric pressure at temperatures of from about 0° to about 150° C., and higher if desired. Preferred temperatures will be room temperature (about 23° C.) to about 55° C.

Reaction is carried out until substantially all the epoxide moieties of the base resin (derived from the epichlorohydrin) have reacted with the tertiary amine. The time of reaction varies inversely with temperature.

The preferred amount of tertiary amine employed will be about two moles for each epoxide moiety of the base resin. However, from 0.5 to 3 moles of tertiary amine can be used with satisfactory results.

In preparing the resins used in this invention, the reaction of the amine with the poly(alkyldiallylamine)-—epichlorohydrin base resin preferably takes place in aqueous medium. The reaction with the amine can be carried out promptly after preparation of the base resin solution. If the base resin solution is to be stored for any length of time prior to reaction with the nitrogen compound, it should be stabilized against gelation.

The base resin is stabilized against gelation by adding to the aqueous solution thereof sufficient aqueous hydrochloric acid to obtain and maintain a pH of about 2. The stabilized product can be reactivated by known means, such as by addition of aqueous sodium hydroxide, prior to reaction with the tertiary amine. On stabilization the epoxide moieties are destroyed; on reactivation, they are restored.

A base resin having epoxide moieties will be comprised of a plurality of units of the following structure.

(II)

-continued

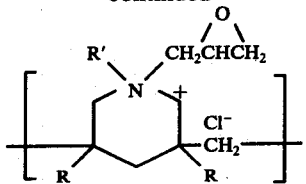

where R and R' are as above defined.

Reaction with a tertiary amine, $R_1R_2R_3N$ produces a resin comprised of a plurality of units of the following structure

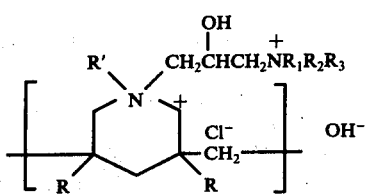
(III)

For use in this invention the resin is employed as the diquaternary chloride. Thus, after reaction with a tertiary amine, as above set forth, aqueous hydrochloric acid is added in an amount sufficient to obtain and maintain a pH of from about 2 to 4. The acid treatment provides a resin having a plurality of units of the following structure.

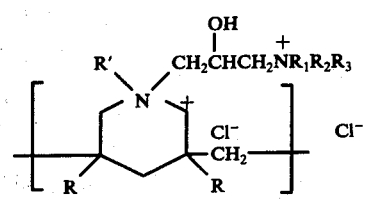
(IV)

In all examples that follow parts and percentages are by weight unless otherwise specified. Example 1 below is illustrative of the preparation of a base resin that can be used in this invention.

EXAMPLE 1

Methyldiallylamine (2224 lbs.) was placed into a reaction vessel. 31% Hydrochloric acid (1920 lbs.) was added cautiously with cooling to give a pH of 3. This solution was then sparged with nitrogen for 20 minutes. Sodium bisulfite (50 lbs. in 40 gals. $H_2O$) and t-butyl hydroperoxide (40 lbs. 70% solution in 40 gals. $H_2O$) were were added simultaneously over an 8 hour period during which the temperature rose to 65° C. followed by cooling to room temperature TS = ~60%, RSV = 0.22 (0.1 M NaCl, 1%, 25° C.)

This polymer solution was transferred to a larger kettle. 4% Sodium hydroxide (450 gals.) and 1335 gals. of water were added giving a pH of 8.4. Epichlorohydrin (280 gals.) was added and the reaction allowed to proceed (40° C.). When the Gardner-Holdt viscosity reached B+ 31% hydrochloric acid (160 gals.) was added giving a pH of <2. The temperature was raised to 80° C. and held for 2 hours. The resin solution was then cooled to 40° C. and 4% sodium hydroxide added to give a pH of 3.5. TS = 20.2%, Brookfield viscosity = 55 cps.

The resin of the Example 1 solution, prior to being acidified, will consist of a plurality of units of the structure

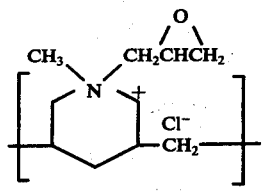
(V)

On being acidified with the 75 parts of 20° Be hydrochloric acid and heated at 60° C. until the pH becomes constant at about 2, the units will have the structure

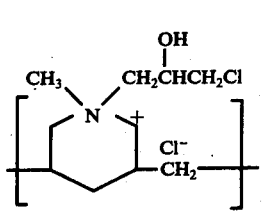
(VI)

EXAMPLE 2

2045 Grams of a 20.5% solids aqueous solution of poly-(methyldiallylamine)-epichlorohydrin resin was placed in a reaction vessel. The aqueous solution contained 420 grams or 1.75 moles of resin. The resin was prepared in a manner similar to that of Example 1. The aqueous resin solution (20.5% solids) was diluted to 5% solids by adding 6355 cc. of water. 1750 cc. of 1 Molar sodium hydroxide was added raising the pH of the solution from 3.5 to 10.9. 816 Grams of a 25% aqueous solution of trimethylamine was added to the contents of the reaction vessel. The amount of trimethylamine in the 25% aqueous solution was 206.5 grams or 3.5 moles. The contents of the reaction vessel were heated to a temperature of 50–55° C. and maintained at this temperature for 3 hours. Unreacted trimethylamine was removed under vacuum. The pH of the resulting aqueous reaction mass was adjusted to 2.8 by adding 121 cc. of concentrated hydrochloric acid.

In Example 2, on raising the pH of the solution from 3.5 to 10.9, the units of structure (V) were reestablished. Prior to pH adjustment with HCl the resin consisted of units of the structure (VII).

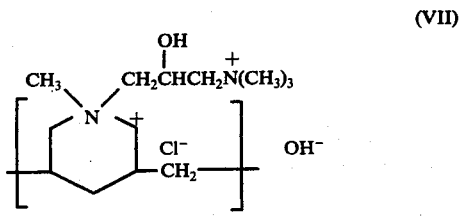
(VII)

On adjustment to pH 2.8 with concentrated hydrochloric acid the resin consisted of units of the structure (VIII)

(VIII)

-continued

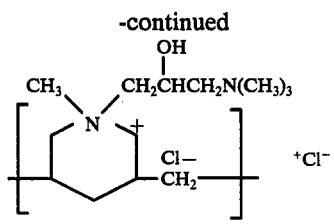

EXAMPLE 3

Example 2 was repeated six times. The aqueous reaction masses of the 7 examples were combined and concentrated to 37.25% solids content on a flash evaporator.

EXAMPLE 4

Sufficient of the 37.25% resins solids solution of Example 3 to provide 30 grams resin (about 80 grams of solution) was combined with 50 grams of calcium carbonate, and 20 grams of starch (Penford Gum 280) and the solids content thereof adjusted to 30% by the addition of water to provide a coating color. The pH of the coating color was then adjusted to 8.5 by the addition of ammonium hydroxide. The coating color was applied on paper prepared from bleached wood fiber. Several sheets were coated at 2 lbs./side and several at 4 lbs./side. The coated sheets were dried on a drum drier at 100° F. The sheets were then coated with zinc oxide with an "O" Mayer rod using the following formulation

| ZnO (Photox 80) | 100 grams |
| Resinous binder (Rohm & Haas F89) | 24 grams |
| Toluene | 43 grams |
| Dye sensitizer* | 0.8 gram |

*(Dye sensitizer consists of bromophenol blue (.34 part), uranine (.5 part), acid green 16 (.15 part) and methanol (99.1 parts).)

The sheets were coated at 15 lbs./3000 ft.$^2$ and dried at 100° C. for 45 seconds.

EXAMPLE 5

Example 4 was repeated with the exception that instead of 20 grams starch there were employed 18.5 grams of starch and 1.5 grams of sodium carboxymethylcellulose having a degree of substitution of 0.9.

EXAMPLE 6

Example 4 was repeated using poly(dimethyldiallylammonium chloride), available as Calgon 261, instead of the resin of Example 2. Calgon 261 has been employed heretofore as a conductive coating on paper and represents prior art.

Volume resistivities of the prepared sheets (2 lbs./side) were determined at 15% relative humidity (front side). Results are set forth below in Table I.

TABLE I

| | (2 lbs./side) | |
| --- | --- | --- |
| Example | Volume Resistivity | Surface Resistivity |
| 4 | 8.6 × 10$^{10}$ ohms | 7.8 × 10$^{10}$ ohms |
| 5 | 4.3 × 10$^{10}$ ohms | 3.1 × 10$^{10}$ ohms |
| 6 (prior art) | 3.1 × 10$^{10}$ ohms | 1 × 10$^{10}$ ohms |

Volume resistivities of the prepared sheets (4 lbs./side) were determined at 15% relative humidity (wire side). Results are set forth in Table II below.

TABLE II

| | (4 lbs./side) |
| --- | --- |
| Example 4 | 6.0 × 10$^{11}$ ohms |
| Example 5 | 6.8 × 10$^{11}$ ohms |
| Example 6 (prior art) | 6.6 × 10$^{11}$ ohms |

The above description and examples are illustrative of the invention and not in limitation thereof.

What I claim and desire to protect by Letters Patent is:

1. In a electroconductive paper base sheet comprising a cellulosic web having disposed on at least one surface thereof an electroconductive layer the improvement wherein the electroconductive layer consists essentially of an electroconductive resin consisting essentially of the diquaternary chloride of the reaction product of (1) a water soluble or water dispersible poly(alkyldiallylamine)-epichlorohydrin base resin having epoxide moieties and (2) a tertiary amine having the formula $R_1R_2R_3N$ where $R_1$ and $R_2$ and $R_3$ are the same or different alkyls having from 1 through 9 carbon atoms in an amount at least stoichiometrically equivalent to the epoxide moieties of the base resin.

2. The electroconductive paper base sheet of claim 1 wherein the tertiary amine employed in preparation of the electroconductive resin is trimethylamine.

3. The electroconductive paper base sheet of claim 1 wherein poly(alkyldiallylamine) is a homopolymer of methyldiallylamine and the tertiary amine is trimethylamine.

* * * * *